US012767354B2

(12) United States Patent
Kuzdro et al.

(10) Patent No.: US 12,767,354 B2
(45) Date of Patent: Oct. 20, 2026

(54) AIRCRAFT COMPONENT IDENTIFICATION SYSTEM

(71) Applicant: PRATT & WHITNEY CANADA CORP., Longueuil (CA)

(72) Inventors: Magdalena Agnieszka Kuzdro, Rzeszów (PL); Krzysztof Zegar, Rzeszów (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 79 days.

(21) Appl. No.: 18/676,667

(22) Filed: May 29, 2024

(65) Prior Publication Data

US 2025/0368355 A1 Dec. 4, 2025

(51) Int. Cl.

*B64F 5/60* (2017.01)
*G06V 20/62* (2022.01)
*G06V 30/146* (2022.01)

(52) U.S. Cl.

CPC ................ *B64F 5/60* (2017.01); *G06V 20/62* (2022.01); *G06V 30/146* (2022.01)

(58) Field of Classification Search

CPC .......... B64F 5/60; G06V 30/146; G06V 20/62
See application file for complete search history.

(56) References Cited

U.S. PATENT DOCUMENTS 7,468,739 B2 12/2008 Fusama
9,639,725 B1 5/2017 Maricic et al.
(Continued)

FOREIGN PATENT DOCUMENTS

CN 108229484 A 6/2018
CN 115862017 A 3/2023
(Continued)

OTHER PUBLICATIONS

Li Canwei et al: "Machine Vision for Automatic Recognition of Aircraft Engine Blade Coding", 2023 4th International Seminar on Artificial Intelligence, Networking and Information Technology (AINIT), IEEE, Jun. 16, 2023 (Jun. 16, 2023), pp. 371-377, XP034403326.
(Continued)

*Primary Examiner* — Kito R Robinson
*Assistant Examiner* — Erin Marie Hartmann
(74) *Attorney, Agent, or Firm* — NORTON ROSE FULBRIGHT CANADA LLP

(57) ABSTRACT

An aircraft component identification system, has: a camera configured for capturing an image of a part identifier on an aircraft component of an aircraft engine, the part identifier including a series of characters; and a controller operatively connected to the camera, the controller having a processing unit and a computer-readable medium having stored thereon instructions executable by the processing unit to: perform optical character recognition on image data obtained from the image captured by the camera to identify the series of characters, including feeding the image data to a trained model, the trained model having been trained using machine learning and training data, the training data including image data sets associated with part identifier sets; and obtain information about the aircraft component using the series of characters of the part identifier.

19 Claims, 9 Drawing Sheets

(56) References Cited

U.S. PATENT DOCUMENTS

| | | | | |
|---|---|---|---|---|
| 11,875,582 | B2 | 1/2024 | Hara | |
| 11,907,841 | B1 * | 2/2024 | Truitner | G06N 3/045 |
| 2003/0111532 | A1 | 6/2003 | Vosburgh | |
| 2019/0338666 | A1 | 11/2019 | Finn | |
| 2022/0165054 | A1 * | 5/2022 | Olwal | H04N 23/651 |
| 2022/0309738 | A1 * | 9/2022 | Asai | G01H 9/00 |
| 2024/0020956 | A1 | 1/2024 | Davis | |
| 2024/0256727 | A1 * | 8/2024 | Chopra | G06F 30/27 |
| 2025/0157242 | A1 * | 5/2025 | Ramaswamy | G06V 30/412 |

FOREIGN PATENT DOCUMENTS

| | | | | |
|---|---|---|---|---|
| CN | 117274587 | A | 12/2023 | |
| DE | 102012109213 | A1 * | 4/2014 | A01B 79/005 |
| FR | 3098252 | A1 * | 1/2021 | G03B 17/561 |
| KR | 20240012790 | A | 1/2024 | |
| WO | 2021/046726 | A1 | 3/2021 | |

OTHER PUBLICATIONS

Yang Guang et al: "Research on automatic recognition system for code of wheel hub model based on OCR", Vibroengineering Procedia, vol. 22, Mar. 15, 2019 (Mar. 15, 2019), pp. 140-145,,XP093293226.
European Search report issued in counterpart EP application No. 25179516.7 on Jul. 21, 2025.

* cited by examiner

322

| | INPUT | OUTPUT |
|---|---|---|
| **Data Set** | **Image** | **ID Number** |
| DS1 | Image #1 | ID #1 |
| DS2 | Image #1 | ID #2 |
| ... | ... | ... |
| DSN | Image #N | ID #N |

AIRCRAFT COMPONENT IDENTIFICATION SYSTEM

TECHNICAL FIELD

The application relates generally to aircraft engines and, more particularly, to systems and methods used to identify components of such engines using their unique identifiers.

BACKGROUND

Aircraft engines are composed of a plurality of parts assembled together. These parts are usually each identified with a part identifier typically composed of typographical symbols, such as numbers, letters or any other suitable characters. For instance, the part identifier may be used to determine when the part has been installed and when it would need replacement. While known methods for identifying engine components have various advantages, there is still room in the art for improvement.

SUMMARY

In one aspect, there is provided an aircraft component identification system, comprising: a camera configured for capturing an image of a part identifier on an aircraft component of an aircraft engine, the part identifier including a series of characters; and a controller operatively connected to the camera, the controller having a processing unit and a computer-readable medium having stored thereon instructions executable by the processing unit to: perform optical character recognition on image data obtained from the image captured by the camera to identify the series of characters, including feeding the image data to a trained model, the trained model having been trained using machine learning and training data, the training data including image data sets associated with part identifier sets; and obtain information about the aircraft component using the series of characters of the part identifier.

The aircraft component identification system described above may include any of the following features, in any combinations.

In some embodiments, the aircraft component is an airfoil of an assembly including a hub and a plurality of airfoils mounted to the hub, the system having a support mechanism for supporting the assembly and the camera, the support mechanism having a movable support operable for moving one of the assembly and the camera relative to the other of the assembly and the camera.

In some embodiments, the assembly is supported by the support, the support being rotatable about an axis being coaxial with a central axis of the assembly.

In some embodiments, a motor is engaged to the support, the motor operatively connected to the controller, the computer-readable medium further having instructions executable by the processing unit to: receive a command from a user; and cause the motor to rotate the assembly in response to the command.

In some embodiments, the support is operatively connected to the controller, the computer-readable medium further having instructions executable by the processing unit to: cause the support to move the one of the assembly and the camera; detect when the part identifier is within a line of sight of the camera; and cause the support to stop moving the one of the assembly and the camera when the part identifier is within the line of sight.

In some embodiments, a light is operatively connected to the controller, the computer-readable medium further having instructions executable by the processing unit to: determine that a luminosity of the image is insufficient; and cause an increase in a power supplied to the light.

In another aspect, there is provided a method of maintaining an aircraft engine, comprising: receiving image data of an image of an aircraft component of the aircraft engine, the image including a part identifier of the aircraft component; performing optical character recognition on the image data to obtain a series of characters of the part identifier by feeding the image data to a trained model, the trained model having been trained using machine learning and training data, the training data including image data sets associated with part identifier sets; determining that the aircraft component needs servicing by obtaining information about the aircraft component using the series of characters of the part identifier; and causing the aircraft component to be serviced.

The method described above may include any of the following features, in any combinations.

In some embodiments, the method includes receiving the aircraft component, the receiving of the image data including capturing an image of the aircraft component using a camera.

In some embodiments, the receiving of the aircraft component includes receiving an airfoil.

In some embodiments, the airfoil is part of an assembly including a plurality of other airfoils, the capturing of the image comprising moving the assembly relative to the camera until the part identifier is within a line of sight of the camera.

In some embodiments, the method includes: determining that a luminosity of the aircraft component is below a minimum luminosity threshold; and increasing power supplied to a light located in a vicinity of the aircraft component.

In some embodiments, the determining that the luminosity is below the minimum luminosity threshold includes receiving a signal from a sensor of the camera, the sensor configured for generating a signal indicative of the luminosity.

In some embodiments, the causing of the aircraft component to be serviced includes causing a replacement or a maintenance of the aircraft component.

In yet another aspect, there is provided a method of performing optical character recognition of a part identifier on an aircraft component of an aircraft engine, comprising: receiving image data of an image of an part identifier on the aircraft component, the part identifier composed of a series of characters; performing optical character recognition on the image data to obtain a series of characters of the part identifier by feeding the image data to a trained model, the trained model having been trained using machine learning and training data, the training data including image data sets associated with part identifier sets; and displaying the series of characters on a display.

The method described above may include any of the following features, in any combinations.

In some embodiments, the method includes receiving the aircraft component, the receiving of the image data including capturing an image of the aircraft component using a camera.

In some embodiments, the receiving of the aircraft component includes receiving an airfoil.

In some embodiments, the airfoil is part of an assembly including a plurality of other airfoils, the capturing of the image comprising moving the assembly relative to the camera until the part identifier is within a line of sight of the camera.

In some embodiments, the method includes: determining that a luminosity of the aircraft component is below a minimum luminosity threshold; and increasing power supplied to a light located in a vicinity of the aircraft component.

In some embodiments, the determining that the luminosity is below the minimum luminosity threshold includes receiving a signal from a sensor, the sensor configured for generating a signal indicative of the luminosity.

In some embodiments, the method includes determining that the aircraft component needs servicing by obtaining information about the aircraft component using the series of characters of the part identifier.

DESCRIPTION OF THE DRAWINGS

Reference is now made to the accompanying figures in which.

DETAILED DESCRIPTION

Figure 1:
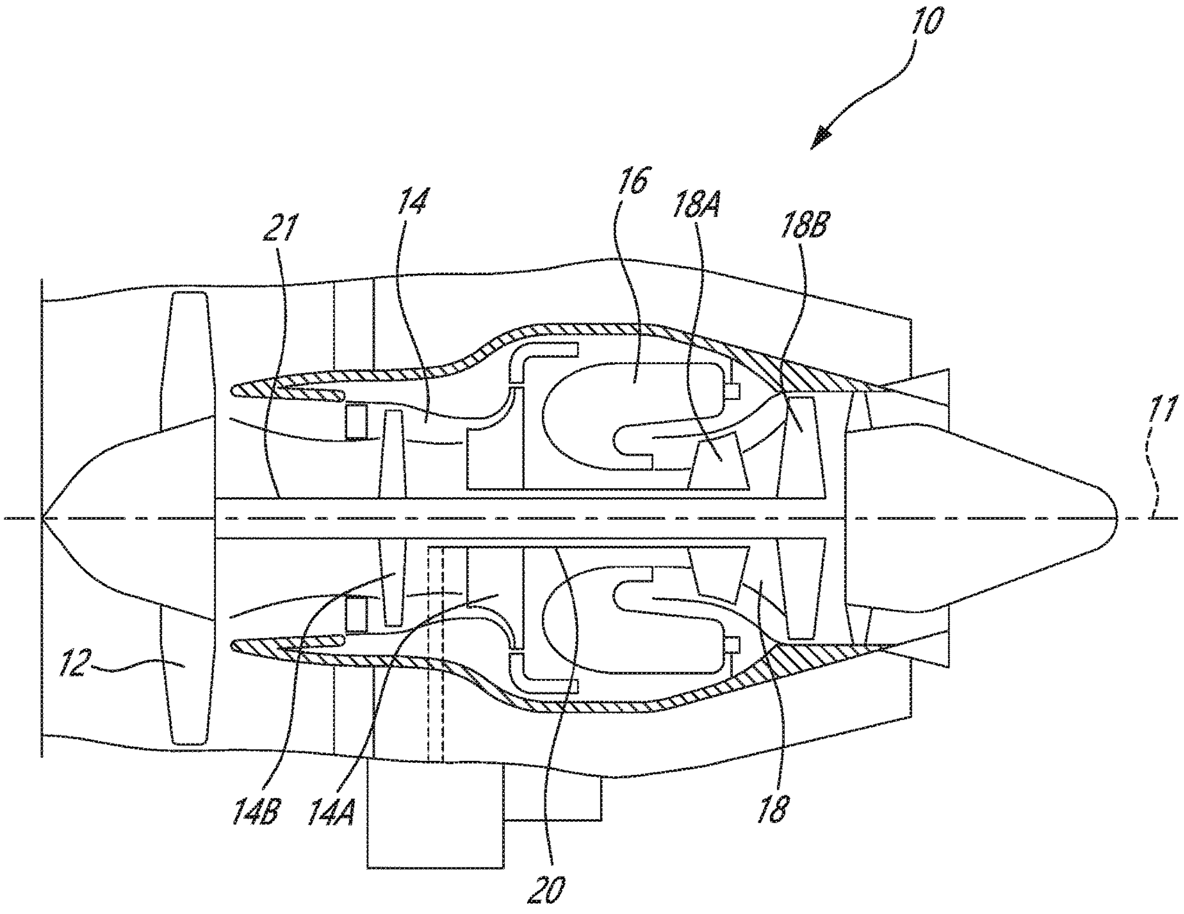
FIG. 1 is a schematic cross sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section 18 to a low-pressure compressor 14B of the compressor section 14 and drivingly engaged to the fan 12. It will be understood that the contents of the present disclosure may be applicable to any suitable engines, such as turboprops and turboshafts, and reciprocating engines, such as piston and rotary engines without departing from the scope of the present disclosure.

The following description will focus on blades of the compressor section 14 of the gas turbine engine 10. It will however be appreciated that the principles of the present disclosure may be utilized for any of the parts of the gas turbine engine 10, such as, for instance, compressor vanes, turbine blades, turbine vanes, variable guide vanes, and so on.

Figure 2:
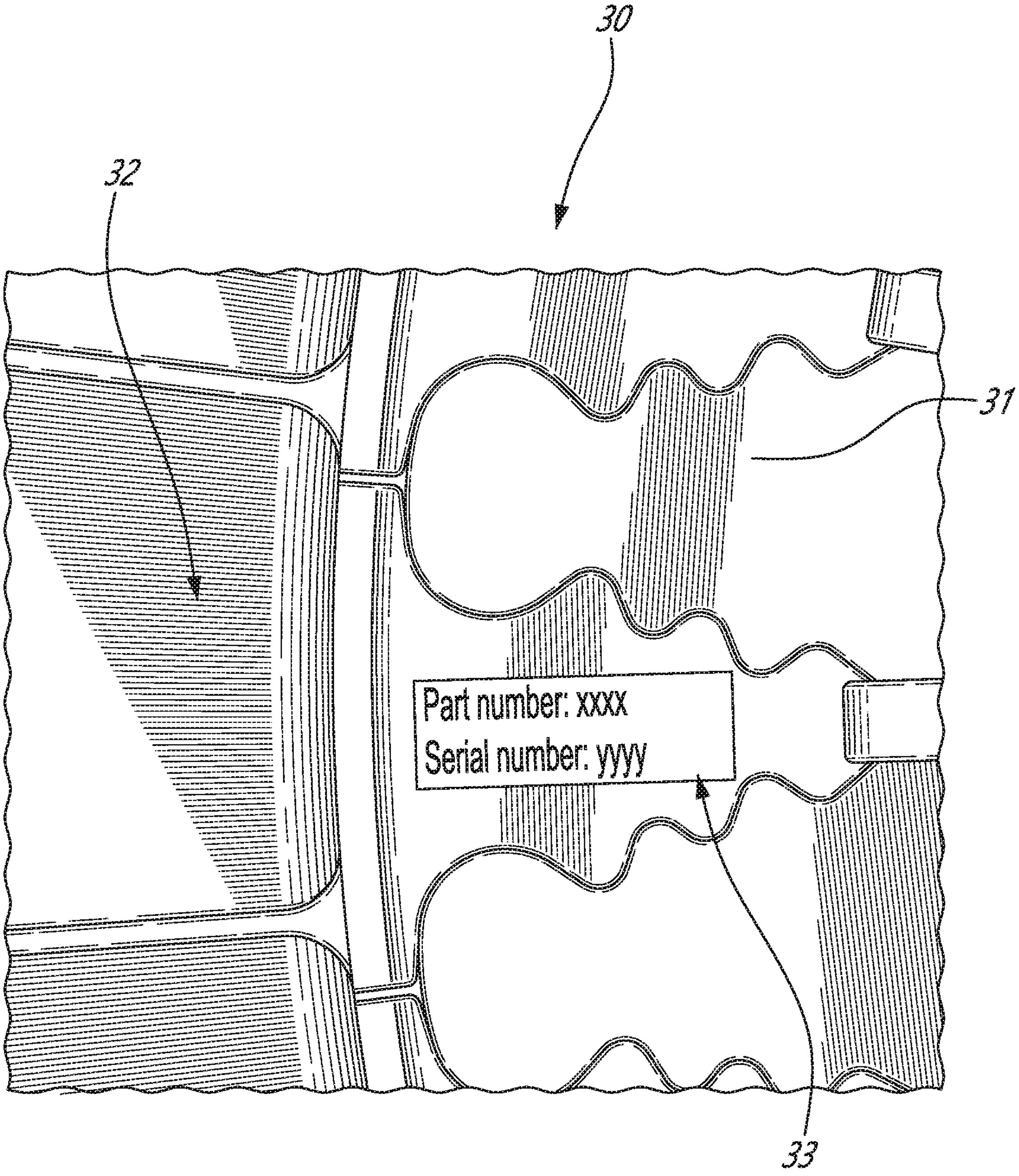
FIG. 2 is a front view of a portion of an aircraft component, depicted as a blade of a compressor rotor of a compressor of the gas turbine engine of FIG. 1.

Referring to FIG. 2, a portion of a compressor rotor 30 of the compressor section 14 (FIG. 1) is shown and includes a hub 31 and blades 32 mounted to the hub 31. Each individual blade 32 is identified by a unique part identifier, which is herein referred to as an identification number 33. However, it is understood that the identification number 33 does not need to be strictly numerical and may contain any suitable typographical symbols. The identification number 33 may include, for instance, a part number referring to what kind of component it is (e.g., compressor blade), and a serial number, which is unique to each component. Identification numbers are used for aircraft component to ensure traceability. Moreover, with the identification number 33, a technician may gather a plethora of information with regards to the component. These information may include, for instance, a manufacturing date of the blade 32, an installation date of the blade 32, when the blade is due for replacement, and so on.

Typically, the identification number 33 is read manually by a technician. However, this process may be time consuming since some identification number 33 may be difficult to read. Indeed, the identification number 33 may become distorted due to thermal cycling of the blade 32. Hence, the identification number 33 may be hard to read or interpret which may cause misreading of the number.

Figure 3:
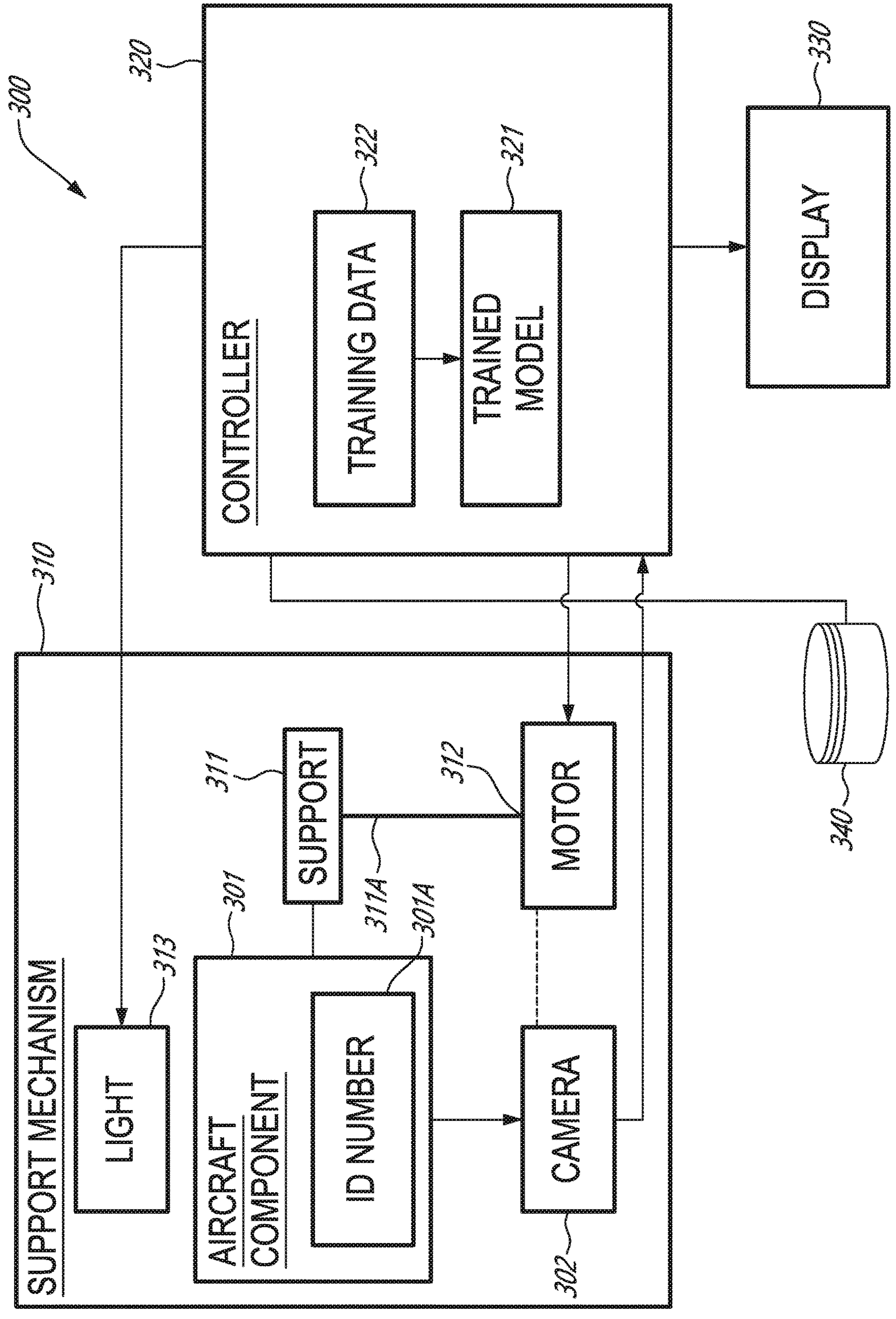
FIG. 3 is a schematic representation of an aircraft component identification system in accordance with one or more embodiments.

Referring to FIG. 3, an aircraft component identification system, referred to below simply as "system" is shown at 300. The system 300 is configured for extracting the identification number 301A marked on an aircraft component 301. The system 300 includes a camera 302 used to take an image of an identification number 301A on the aircraft component 301.

Figure 3A:
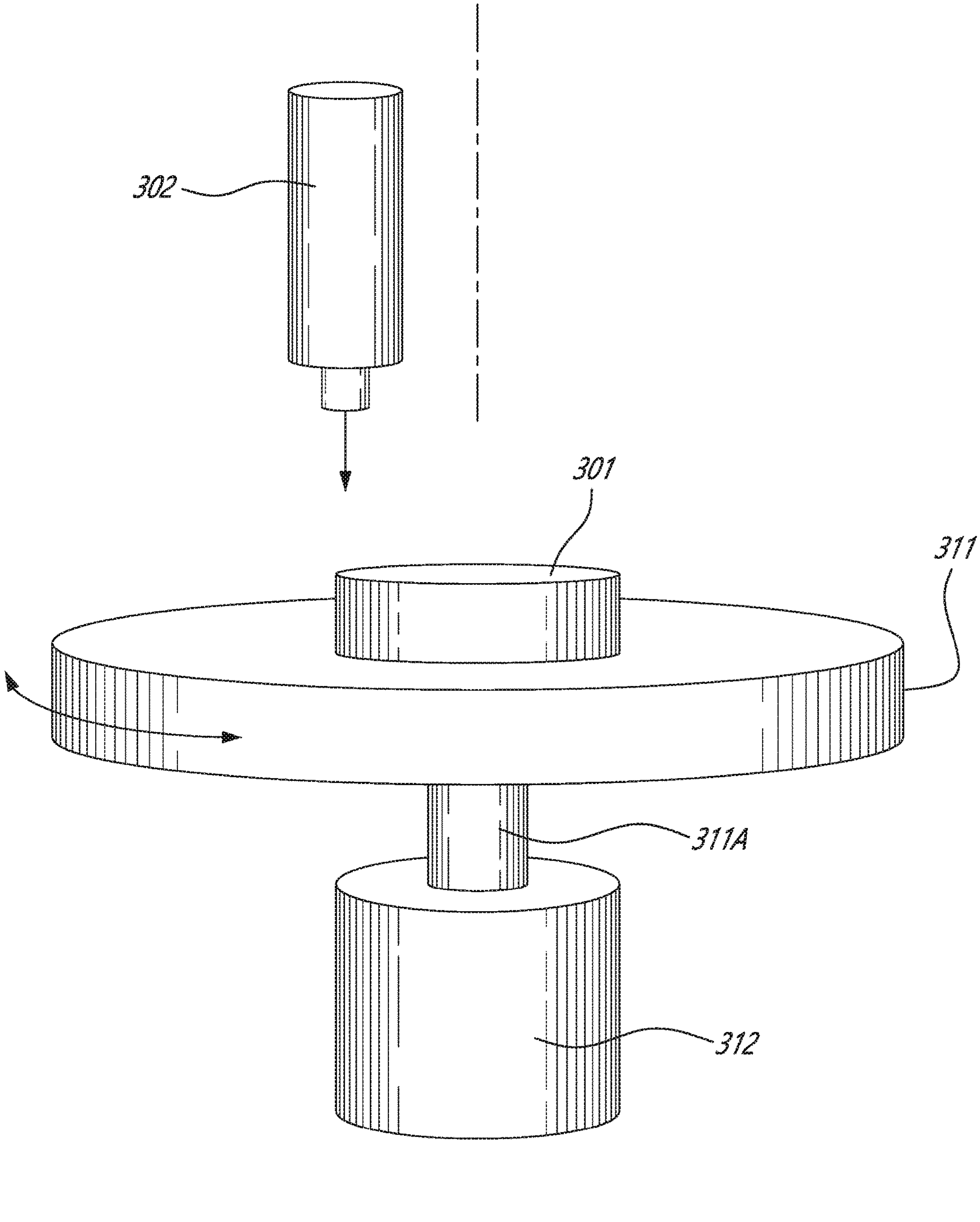
FIG. 3A is a three-dimensional view illustrating the support mechanism of FIG. 3.

In the embodiment shown, and as also depicted in FIG. 3A, the system 300 includes a support mechanism 310 for supporting the aircraft component 301 and the camera 302. The support mechanism 310 includes a movable support 311 operable for moving one of the aircraft component 301 and the camera 302 relative to the other of the aircraft component 301 and the camera 302. The support mechanism 310 may include a motor 312 engaged to the one of the aircraft component 301 and the camera 302.

When the aircraft component 301 corresponds to the blade 32 mounted on the hub 31, the movable support 311 may be configured to hold an assembly of the hub 31 and the blades 32 mounted thereto and the motor 312 may rotate this assembly about a central axis 11 (FIG. 1) thereof. Thus, the movable support 311 is rotatable about an axis which may be coaxial with the central axis 11 of the assembly of the hub 31 and the blades 32 mounted thereto. The movable support 311 may include a shaft 311A that may be inserted into a central bore of the hub 31. The shaft 311A may be drivingly engaged to the motor 312 for rotating the assembly about the central axis 11.

Therefore, the camera 302 may be positioned such that it has a line of sight aligned with a known location of the identification number 301A and the motor 312 may rotate the assembly to sequentially align each of the identification number 301A of each of the blades of the compressor rotor 30 (FIG. 2). The camera 302 may thus take an image of the identification number of each blade, one after the other. Alternatively, the motor 312 may be engaged to the camera 302 to move the camera 302 while the aircraft component 301 remains immobile. The motor 312 may include any means to move the component or the camera. These means may include, for instance, actuators, rails, chain and sprockets, etc.

It will be appreciated that, in some embodiments, the support may be omitted and that the camera 302 may be hand-operated by a technician to take the image of the aircraft components 301 and of its identification number 301A without departing from the scope of the present disclosure.

The support mechanism 310 may further include a light source 313 to adjust a luminosity to ensure that the image taken by the camera 302 is suitably illuminated to read the identification number 301A.

Still referring to FIG. 3, in the embodiment shown, the system 300 includes a controller 320 operatively connected to the camera 302, and, when present, operatively connected to the motor 312, and to the light source 313. The controller 320 is configured to perform optical character recognition on image data obtained from the camera 302 to obtain a series of characters that compose the identification number 301A. The controller 320 includes a trained model 321 being trained using machine learning and training data 322. The training data includes image data sets associated with identification number sets.

Figure 4:
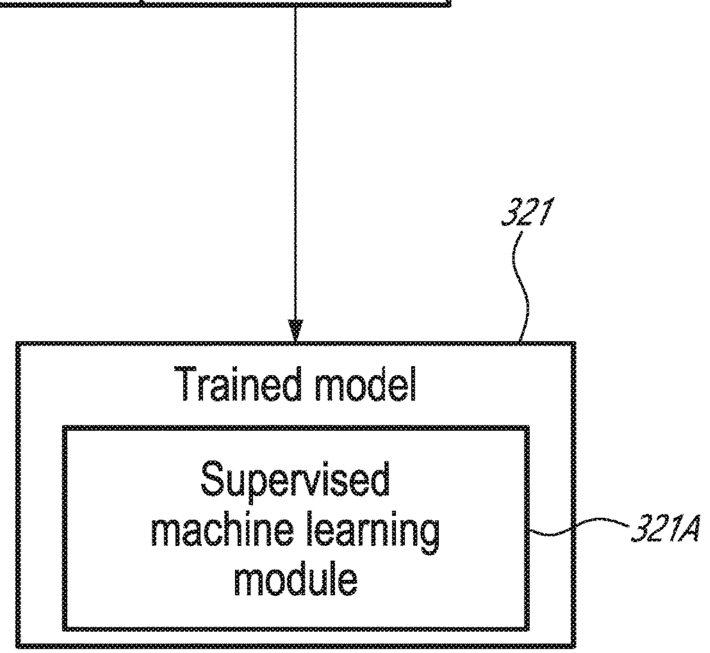
FIG. 4 is a schematic view of training data used for training a trained model of the system of FIG. 3.

Referring to FIG. 4, the training data 322 are shown schematically. The trained model 321 may be trained using historical data 322, also referred to as training data, of a plurality of images of identification numbers. A suitable type of (e.g., classification) trained model may be constructed according to example embodiments of the present disclosure. For instance, a random forest (RF) model and/or a neural network (NN) model may be constructed. In some embodiments, non-linear regression with or without regularization may be used. In some embodiments, one or more of gradient boost machine, artificial neural network, self-organizing maps, and/or deep learning may be used. In some embodiments, a RF regression model of corrosion and erosion data may be constructed.

In the present embodiment, the trained model 321 may be trained using one or more supervised learning algorithms. Such supervised learning algorithm(s) may build a mathematical model of a set of data that contains both the inputs and the desired outputs. The data is known as training data, and consists of a set of training examples (e.g., data sets). Each training example has one or more inputs and the desired output, also known as a supervisory signal. In the mathematical model, each training example may be represented by an array or vector, sometimes called a feature vector, and the training data is represented by a matrix. Through iterative optimization of an objective function, the supervised learning algorithm(s) may learn a function that can be used to predict the output associated with new inputs. An optimal function may allow the algorithm to correctly determine the output for inputs that were not a part of the training data. An algorithm that improves the accuracy of its outputs or predictions over time is said to have learned to perform that task.

Types of supervised-learning algorithms include active learning, classification and regression. Classification algorithms are used when the outputs are restricted to a limited set of values, and regression algorithms are used when the outputs may have any numerical value within a range. In the present case, a suitable classification algorithm may be used to output a suitable class label (e.g., one of four possible class labels) for the training data 322.

As shown in FIG. 4, the trained model 321 is trained using the training data 322. The training data 322 includes a plurality of data sets identified as "DS1", "DS2" and "DSN". Each data set includes image data, labelled "Image #1", "Image #2", "Image #N" and associated identification number data, labelled "ID #1", "ID #2", "ID #N". More specifically, each of the image data includes an identification number and each of the associated identification number data includes the series of characters that compose the identification number. The trained model 321 has a supervised machine learning module 321A that is able to learn how to associate the image data to its respective identification number. By feeding the training data 322 to the supervised machine learning module 321A, the trained model 321 becomes able to recognize many variations in the same character. For instance, the markings of the identification numbers on the aircraft components may be done using many techniques such as engraving, etching, painting, and so on. The font of the characters may vary. For instance, the digit zero may be written as a simple "O" or may include a diagonal line extending through it. The characters may be in bold, italic, and so on. By feeding the supervised machine learning module 321A with all of these variations, the trained model 321 may become able to accurately identify each of the characters composing the identification number. Moreover, with use, the identification number may become faded or partially erased. Partially erased or faded identification number may be part of the training data so that the trained model 321 becomes able to identify the identification number even when partially damaged.

The supervised machine learning module 321A uses supervised learning algorithms by which it builds a mathematical model from a set of data (e.g., historical data 322) that contains both the inputs (e.g., image data) and the desired outputs (e.g., identification number data). Through iterative optimization of an objective function, the supervised machine learning module learns a function that can be used to predict the output associated with new inputs. An optimal function will allow the trained model 321 to correctly determine the output for inputs that were not a part of the historical data 322.

Figure 5:
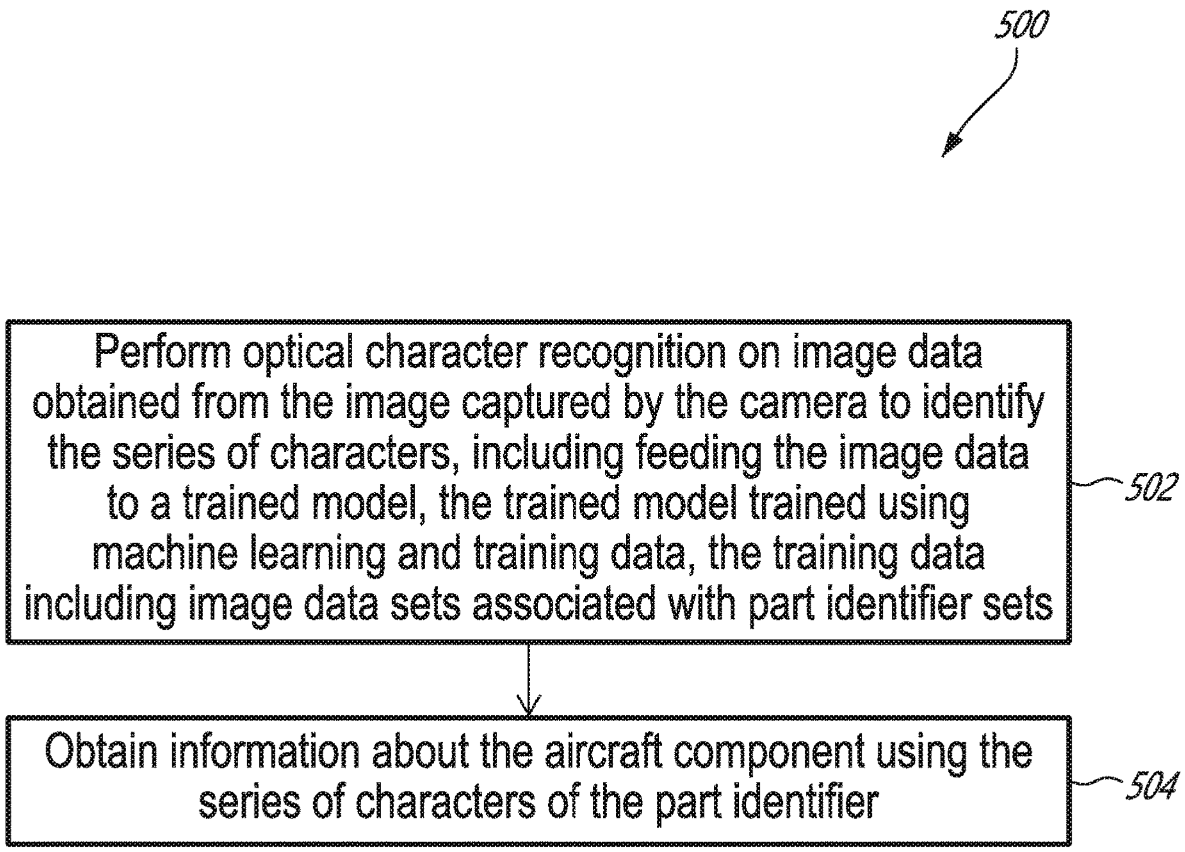
FIG. 5 is a flowchart illustrating steps of a method for extracting a part identifier for an aircraft component.

Referring now to FIG. 5, the controller 320 is configured to execute a method 500 including the steps of performing optical character recognition on the image data to obtain a series of characters of the identification number by feeding the image data to the trained model 321, the trained model 321 being trained using machine learning and the training data 322, the training data 322 including image data sets associated with identification number sets at 502; and obtaining information about the aircraft component using the series of characters of the identification number at 504. The method 500 may include causing the camera 302 to capture the image of the aircraft component 301 to generate image data of the image component.

The performing of the optical character recognition at 504 may include a plurality of sub-steps. For instance, a preprocessing step may be performed. This preprocessing step may include improving the quality of the image. This might include adjustments like correcting the brightness and contrast, removing noise, correcting skew (tilting of the image), and adjusting the resolution. The objective is to make the text as clear as possible to increase the accuracy of character recognition. Then, a text detection step may occur. This step includes detecting where the identification number is located on the image received from the camera. Then, the controller may proceed with a character segmentation step in which the identification number is separated into individual characters. At which point, each character may be analyzed and compared to a set of predefined patterns by the trained model. A post-processing step may be used to correct common recognition errors. The controller may take a series of photos of each serial number and only the learned characters may be stored in the database. The characters of bad visual quality may not be stored to avoid disrupting future readings.

As previously described with regards to FIG. 3, the controller 320 may be operatively connected to the motor 312 of the support mechanism 310. The controller 320 may thus be configured to receive a command from a user; and cause the motor 312 to rotate the assembly (e.g., compressor rotor) in response to the command. In some cases, the motor 312 may be instructed to rotate a given number of degrees. An encoder may be used to ensure that the motor 312 is rotated to the desired position. The number of degrees of rotation may be known in advance for a given compressor rotor. For instance, the number of blades on the rotor is known and the required angle of rotation may be computed based on the number of blades. In some cases, an employee may instruct the motor 312 to rotate the assembly until the technician sees that the camera is aligned with the identification number 301A to read. Alternatively, the controller 320 may be configured to cause the support to move the assembly and to stop the moving of the assembly when it is detected that the identification number is within a line of sight of the camera. At which point, the controller 320 may cause the support to stop moving the assembly when the identification number is within the line of sight of the camera 302.

In some embodiments, the controller 320 may determine that a luminosity of the image is insufficient and cause an increase in a power supplied to the light source 313. In some cases, the detecting of the insufficient luminosity may be done by the camera 302. Alternatively, a light sensor in a vicinity of the aircraft component 301 may be used. Such a light sensor would be operatively connected to the controller 320 to send a signal to the controller 320 indicative of a value of the luminosity. If this value is below a given threshold, the controller 320 may case the light source 313 to be powered, or to increase a power supplied to the light source. The light sensor may be part of the camera 302.

The communicating of the series of character to the user may be used via a display 330 operatively connected to the controller 320. In some cases, the communicating of the series of character may include supplying the series of characters composing the identification number to the controller 320, which may be operatively connected to a database 340. The database 340 may include a list of data associated with a plurality of identification numbers. Hence, the controller 320 may feed the series of characters composing the identification number to the database 340 and fetch all of the information associated with the aircraft component. These information may include, for instance, a manufacturing date, maintenance action required for the aircraft component, and so on.

Figure 6:
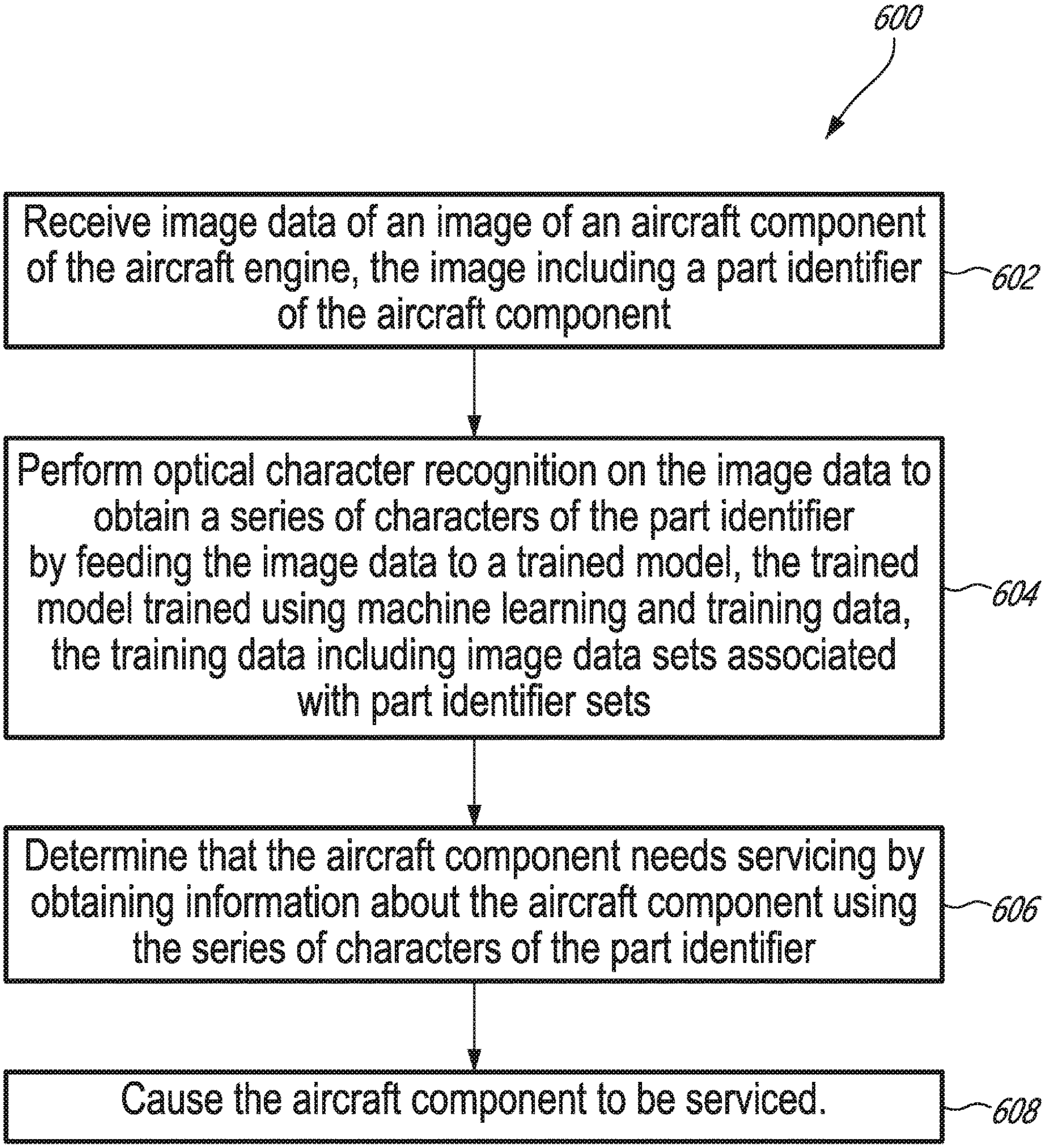
FIG. 6 is a flowchart illustrating steps of a method of maintaining an aircraft engine.

Referring now to FIG. 6, a method of maintaining the aircraft engine is shown at 600. The method 600 includes receiving image data of an image of the aircraft component 301 of the aircraft engine, the image including the identification number 301A of the aircraft component at 602. Then, optical character recognition may be performed on the image data to obtain a series of characters of the identification number by feeding the image data to the trained model 321 at 604. It may be then determined that the aircraft component 301 needs servicing by obtaining information about the aircraft component using the series of characters of the identification number at 606. At which point, the method 600 includes causing the aircraft component 301 to be serviced at 608. This may include, scheduling the aircraft component 301 to be replaced, cleaned, repaired, inspected, and so on. All of the steps described above with reference to FIG. 5 may be used when performing the steps of the method 600 of FIG. 6.

Figure 7:
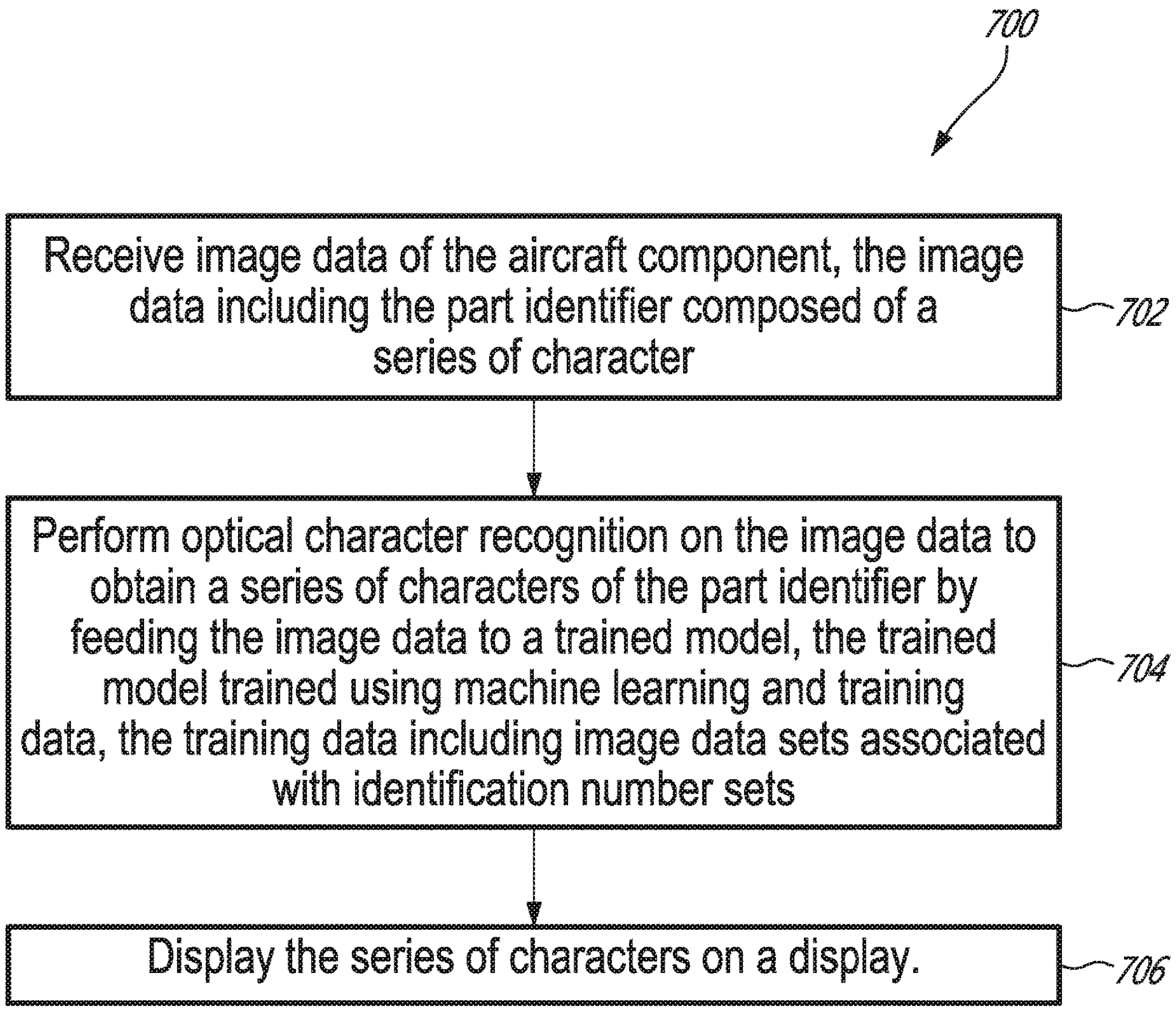
FIG. 7 is a flowchart illustrating steps of a method for performing optical character recognition of an identifier marked on an aircraft component.

Referring now to FIG. 7, a method of performing optical character recognition on the identification number 301A of the aircraft component 301 is shown at 700. The method 700 receiving image data of an image of the identification number 301A on the aircraft component 301 at 702. The method 700 then includes performing optical character recognition on the image data to obtain a series of characters of the identification number by feeding the image data to the trained model 321 as discussed above at 704. Then, the series of characters may be displayed on the display 330 at 708. All of the steps described above with reference to FIG. 5 may be used when performing the steps of the method 700 of FIG. 7. The method 700 may include receiving the aircraft component and capturing the image of the aircraft component using the camera 302.

Figure 8:
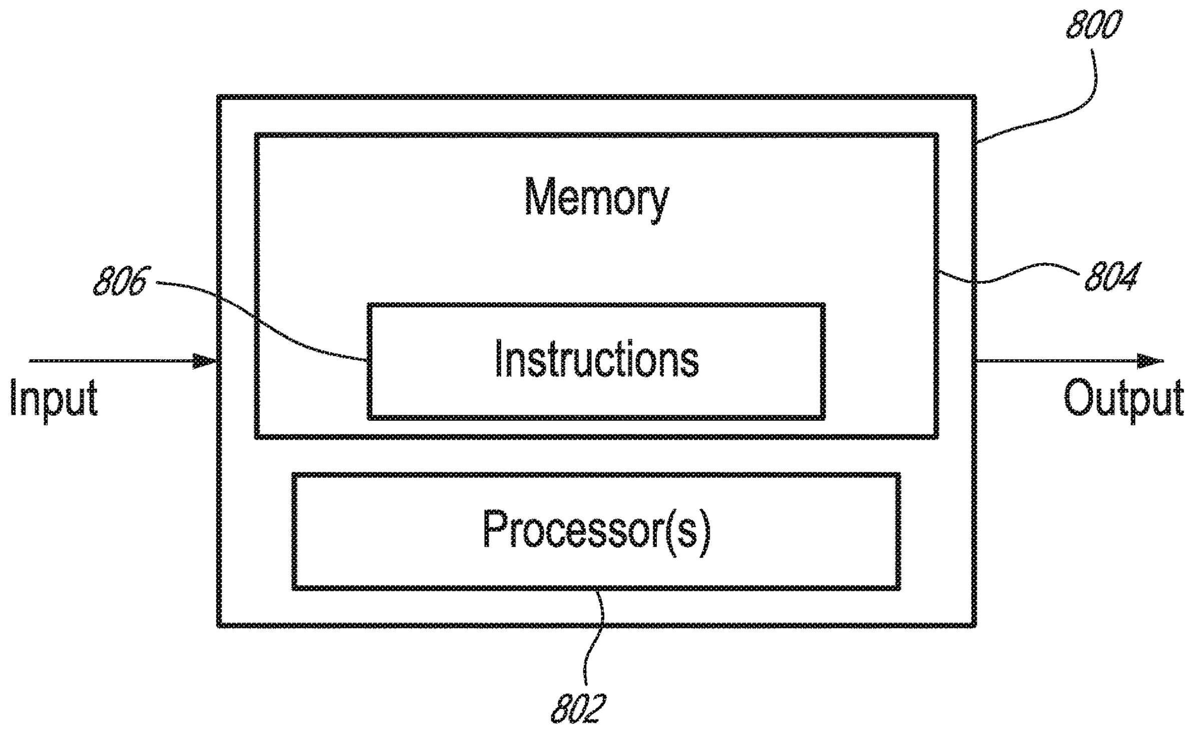
FIG. 8 is a schematic representation of a controller.

With reference to FIG. 8, an example of a computing device 800 is illustrated. For simplicity only one computing device 800 is shown but the system may include more computing devices 800 operable to exchange data. The computing devices 800 may be the same or different types of devices. The controller 320 may be implemented with one or more computing devices 800.

The computing device 800 comprises a processing unit 802 and a memory 804 which has stored therein computer-executable instructions 806. The processing unit 802 may comprise any suitable devices configured to implement the methods described herein such that instructions 806, when executed by the computing device 800 or other programmable apparatus, may cause the functions/acts/steps performed as part of the methods described herein to be executed. The processing unit 802 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 804 may comprise any suitable known or other machine-readable storage medium. The memory 804 may comprise non-transitory computer readable storage medium, for example, but not limited to, an electronic, magnetic, optical, electromagnetic, infrared, or semiconductor system, apparatus, or device, or any suitable combination of the foregoing. The memory 804 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 804 may comprise any storage means (e.g., devices) suitable for retrievably storing machine-readable instructions 806 executable by processing unit 802.

The methods and systems described herein may be implemented in a high level procedural or object oriented programming or scripting language, or a combination thereof, to communicate with or assist in the operation of a computer system, for example the computing device 800. Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or more specifically the processing unit 802 of the computing device 800, to operate in a specific and predefined manner to perform the functions described herein, for example those described in the methods.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft component identification system, comprising:
- a camera configured for capturing an image of a part identifier on an aircraft component of an aircraft engine, the part identifier including a series of characters;
- a support mechanism having a movable support supporting the aircraft component, the movable support operable for moving the aircraft component and the camera relative to one another; and
- a controller operatively connected to the camera, the controller having a processing unit and a non-transitory computer-readable medium having stored thereon instructions executable by the processing unit to:
  - perform optical character recognition on image data obtained from the image captured by the camera to identify the series of characters, including feeding the image data to a trained model, the trained model having been trained using machine learning and training data, the training data including image data sets associated with part identifier sets, the part identifier sets including partially damaged part identifiers, including moving the aircraft component and the camera relative to one another with the support mechanism; and
  - obtain information about the aircraft component using the series of characters of the part identifier.

2. The system of claim 1, wherein the aircraft component is an airfoil of an assembly including a hub and a plurality of airfoils mounted to the hub, the assembly mounted on the movable support.

3. The system of claim 2, wherein the assembly is supported by the movable support, the movable support being rotatable about an axis coaxial with a central axis of the assembly.

4. The system of claim 3, comprising a motor engaged to the movable support, the motor operatively connected to the controller, the non-transitory computer-readable medium further having instructions executable by the processing unit to:
- receive a command from a user; and
- cause the motor to rotate the assembly in response to the command.

5. The system of claim 2, wherein the movable support is operatively connected to the controller, the non-transitory computer-readable medium further having instructions executable by the processing unit to:
- cause the movable support to move the one of the assembly and the camera;
- detect when the part identifier is within a line of sight of the camera; and
- cause the movable support to stop moving the one of the assembly and the camera when the part identifier is within the line of sight.

6. The system of claim 1, comprising a light operatively connected to the controller, the non-transitory computer-readable medium further having instructions executable by the processing unit to:
- determine that a luminosity of the image is below a minimum threshold; and
- cause an increase in a power supplied to the light.

7. A method of maintaining an aircraft engine, comprising:
- receiving image data of an image of an aircraft component of the aircraft engine, the image being captured with a camera and including a part identifier of the aircraft component;
- performing optical character recognition on the image data to obtain a series of characters of the part identifier by feeding the image data to a trained model, the trained model having been trained using machine learning and training data, the training data including image data sets associated with part identifier sets, the part identifier sets including partially damaged part identifiers, the capturing of the image includes moving the camera and the aircraft component relative to one another until the part identifier is within a line of sight of the camera;
- determining that the aircraft component needs servicing by obtaining information about the aircraft component using the series of characters of the part identifier; and
- causing the aircraft component to be serviced.

8. The method of claim 7, wherein the receiving of the image data includes capturing an image of the aircraft component using a camera.

9. The method of claim 8, wherein the aircraft component is an airfoil.

10. The method of claim 9, wherein the airfoil is part of an assembly including a plurality of other airfoils, the capturing of the image comprising moving the assembly relative to the camera until the part identifier is within the line of sight of the camera.

11. The method of claim 8, comprising:
- determining that a luminosity of the aircraft component is below a minimum luminosity threshold; and
- increasing power supplied to a light located in a vicinity of the aircraft component.

12. The method of claim 11, wherein the determining that the luminosity is below the minimum luminosity threshold includes receiving a signal from a sensor of the camera, the sensor configured for generating a signal indicative of the luminosity.

13. The method of claim 7, wherein the causing of the aircraft component to be serviced includes causing a replacement or a maintenance of the aircraft component.

14. A method of performing optical character recognition of a part identifier on an aircraft component of an aircraft engine, comprising:
- receiving image data of an image of a part identifier on the aircraft component, the part identifier composed of a series of characters, including capturing an image of the aircraft component using a camera;
- performing optical character recognition on the image data to obtain a series of characters of the part identifier by feeding the image data to a trained model, the trained model having been trained using machine learning and training data, the training data including image data sets associated with part identifier sets, the part identifier sets including partially damaged part identifiers, the capturing of the image includes moving the camera and the aircraft component relative to one another until the part identifier is within a line of sight of the camera; and
- displaying the series of characters on a display.

15. The method of claim 14, wherein the aircraft component is an airfoil.

16. The method of claim 15, wherein the airfoil is part of an assembly including a plurality of other airfoils, the capturing of the image comprising moving the assembly relative to the camera until the part identifier is within the line of sight of the camera.

17. The method of claim 14, comprising:

determining that a luminosity of the aircraft component is below a minimum luminosity threshold; and increasing power supplied to a light located in a vicinity of the aircraft component.

18. The method of claim 17, wherein the determining that the luminosity is below the minimum luminosity threshold includes receiving a signal from a sensor, the sensor configured for generating a signal indicative of the luminosity.

19. The method of claim 14, comprising determining that the aircraft component needs servicing by obtaining information about the aircraft component using the series of characters of the part identifier.

* * * * *